United States Defensive Publication [19] (H) [11] T959,008

Chandra [43] June 7, 1977

[54] METHOD OF TREATING POLYMER LATICES

[75] Inventor: Bala Perampalam Chandra, Huntingdon, England

[73] Assignee: Imperial Chemical Industries Limited, London, England

[21] Appl. No.: 728,919

[22] Filed: Oct. 4, 1976

[30] Foreign Application Priority Data

Oct. 13, 1975 United Kingdom ..... 41847/75

[51] Int. Cl.[2] ..... C08F 27/00

[52] U.S. Cl. ..... 528/500; 159/47 R; 159/48 R; 526/344; 528/483

[57] ABSTRACT

A method of continuously treating an aqueous latex of a synthetic polymer which contains unreacted residual monomer from the polymerization reaction used for the production of the polymer, which method comprises feeding the aqueous latex as a spray into the top of a vertical column so that it forms a liquid film on the inner surface thereof which film then flows down the column, and contacting the spray and the descending film with an upward flow of a hot inert gas or vapor whereby residual monomer is separated from the latex and is removed with the flow of inert gas or vapor leaving the column. Apparatus for carrying out the method is also claimed. The method is advantageously employed for the removal of residual vinyl chloride monomer from a latex of a vinyl chloride polymer.

19 Claims, 1 Sheet Drawing,

14 Pages Specification

The file of this unexamined application may be inspected and copies thereof may be purchased (849 O.G. 1221, Apr. 9, 1968).

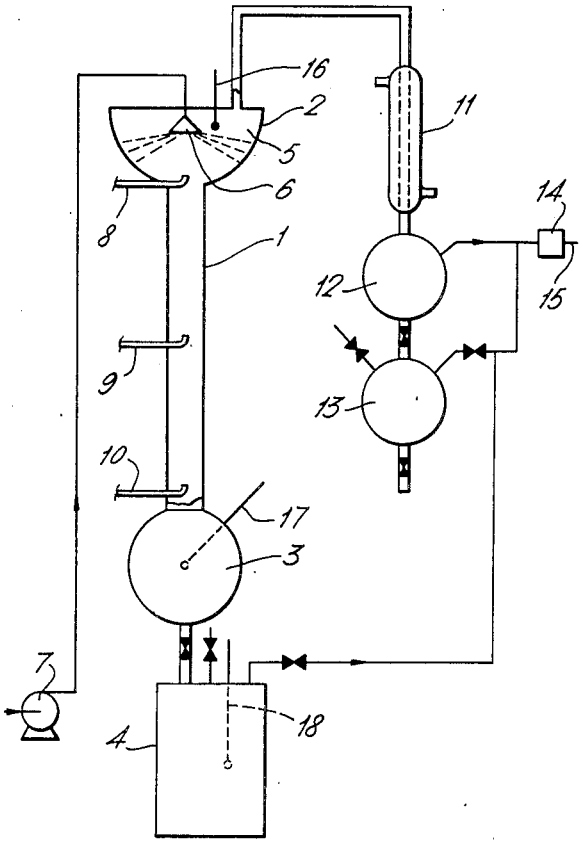

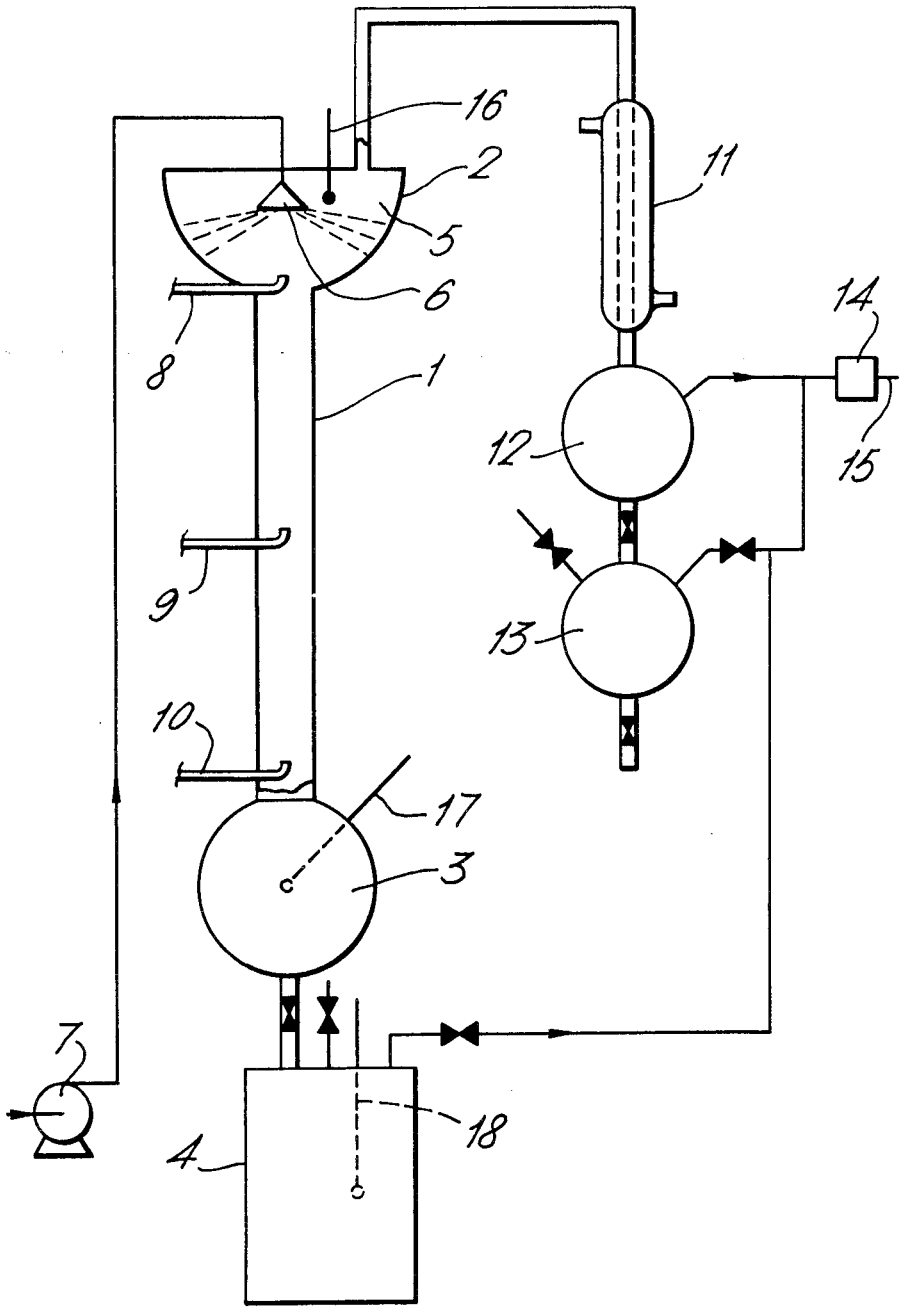
16
2
11
5
6
14
8
1
12
15
9
13
10
17
3
7
18
4